US007988098B2

(12) United States Patent
Baudasse et al.

(10) Patent No.: US 7,988,098 B2
(45) Date of Patent: Aug. 2, 2011

(54) ACTUATOR FOR SYSTEMS FOR GUIDING SPACE EQUIPMENT WITH A VARIABLE RATE OF ROTATION

(75) Inventors: Yannick Baudasse, Grasse (FR); Jérôme Brossier, Cannes la Bocca (FR); Xavier Jeandot, Mandelieu (FR)

(73) Assignee: Thales, Neuilly-sur-Seine (FR)

( * ) Notice: Subject to any disclaimer, the term of this patent is extended or adjusted under 35 U.S.C. 154(b) by 992 days.

(21) Appl. No.: 11/773,764

(22) Filed: Sep. 13, 2007

(65) Prior Publication Data
US 2008/0156938 A1 Jul. 3, 2008

(30) Foreign Application Priority Data

Jul. 5, 2006 (FR) ..................................... 06 52805

(51) Int. Cl.
*B64G 1/22* (2006.01)
(52) U.S. Cl. ..................... 244/172.6; 244/158.1; 74/470
(58) Field of Classification Search .............. 244/172.6, 244/158.1; 74/470, 491, 504, 519
See application file for complete search history.

(56) References Cited

U.S. PATENT DOCUMENTS

| 3,587,999 | A | * | 6/1971 | Miniovitch et al. ......... 244/172.6 |
| 4,373,690 | A | * | 2/1983 | Stillman et al. ............. 244/172.6 |
| 4,884,464 | A | * | 12/1989 | Grattarola et al. ................. 74/50 |
| 5,673,459 | A | * | 10/1997 | Baghdasarian .................. 16/308 |
| 5,911,536 | A | * | 6/1999 | Roth ............................. 403/119 |
| 6,267,363 | B1 | | 7/2001 | Genequand et al. |
| 6,956,696 | B2 | * | 10/2005 | Hachkowski et al. ......... 359/399 |
| 2003/0192994 | A1 | * | 10/2003 | Holemans ................. 244/158 R |

FOREIGN PATENT DOCUMENTS

| EP | 0 481 857 A1 | 4/1992 |
| EP | 0 738 656 A1 | 10/1996 |
| FR | 2 703 415 A1 | 10/1994 |

* cited by examiner

*Primary Examiner* — Christopher P Ellis
(74) *Attorney, Agent, or Firm* — Sughrue Mion, PLLC

(57) ABSTRACT

Actuator for a device for the rotary positioning of a movable element for space equipment comprising a part attached to the fixed portion of said equipment, a bearing, a sleeve designed to actuate the movable portion of said equipment and mounted on an output shaft supported by a first race of said bearing, said actuator comprising a mechanically movable input means and being capable of converting a movement of the input means into a rotary movement of the output shaft about the axis of said bearing, characterized in that said second race of said bearing is connected in rotation to the part of said equipment, in that an adjustable stop so as to angularly limit the relative rotation of the two races of the bearing, and in that the rate of rotation of the output shaft in response to a movement of the input means is different depending on whether or not the sleeve is resting on the adjustable stop.

10 Claims, 3 Drawing Sheets

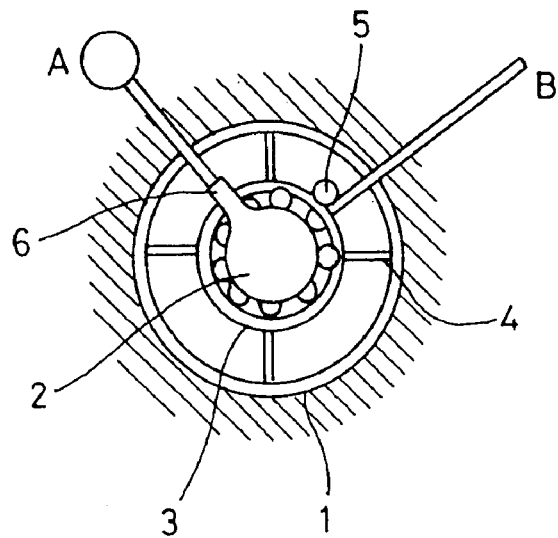
FIG_1
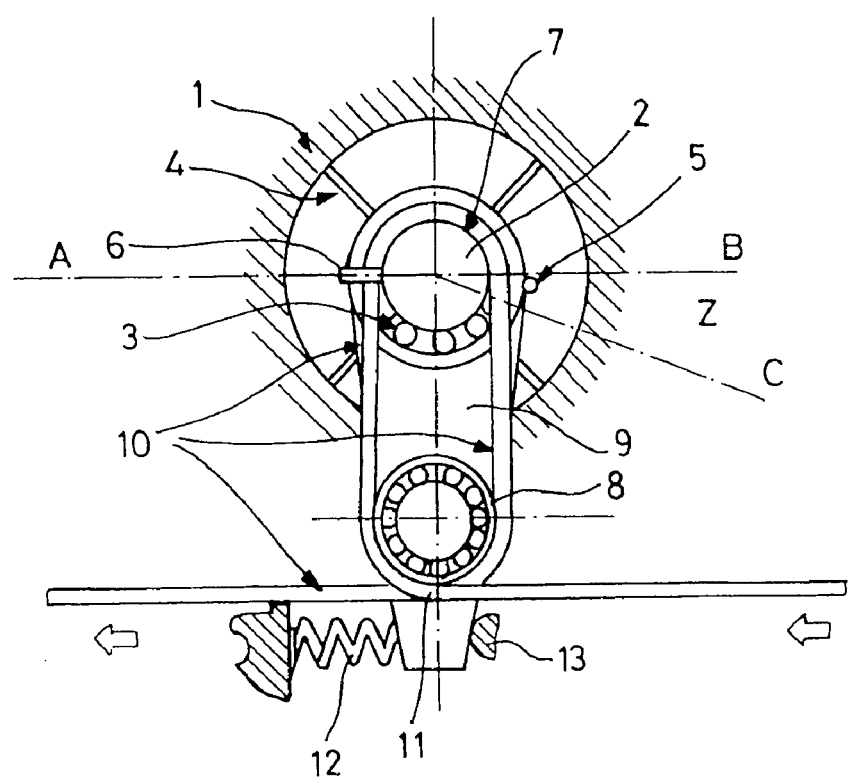
FIG_2

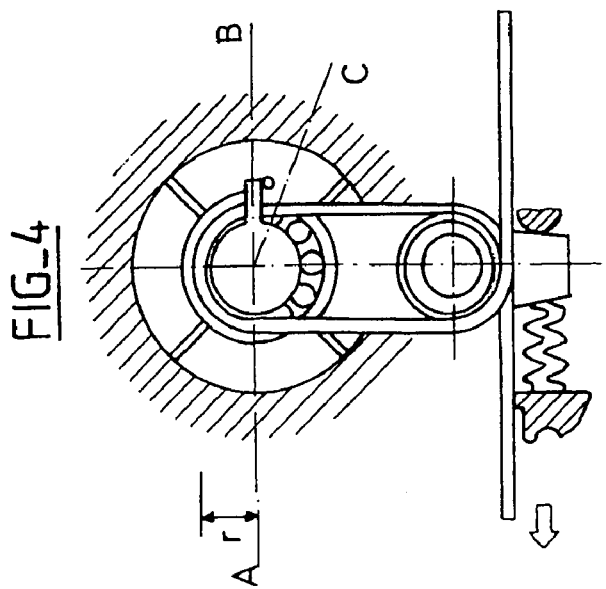
FIG_4
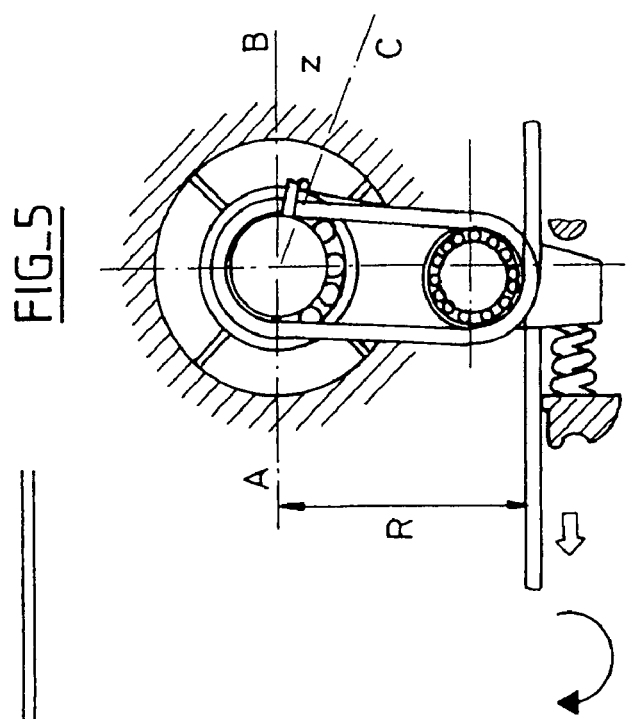
FIG_5
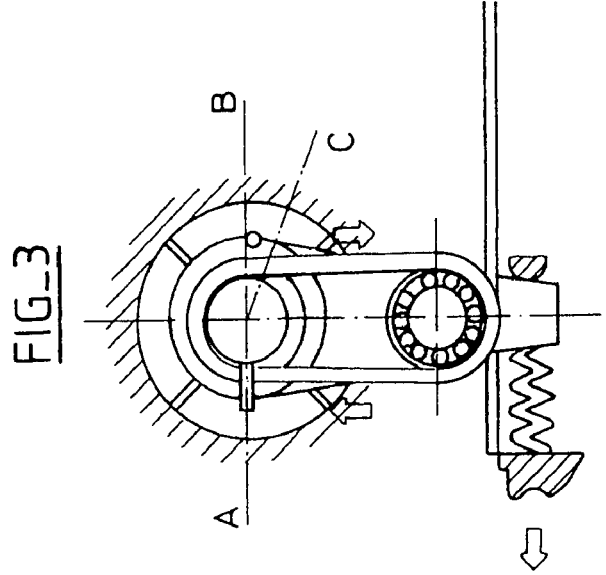
FIG_3

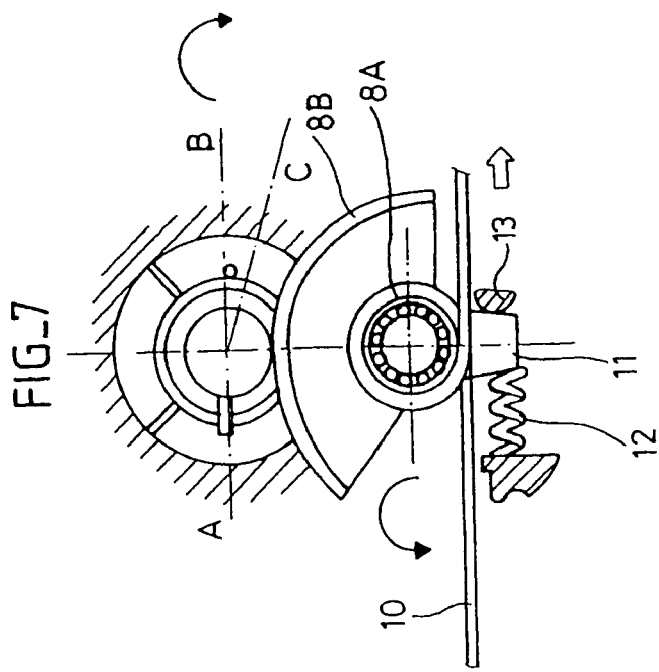
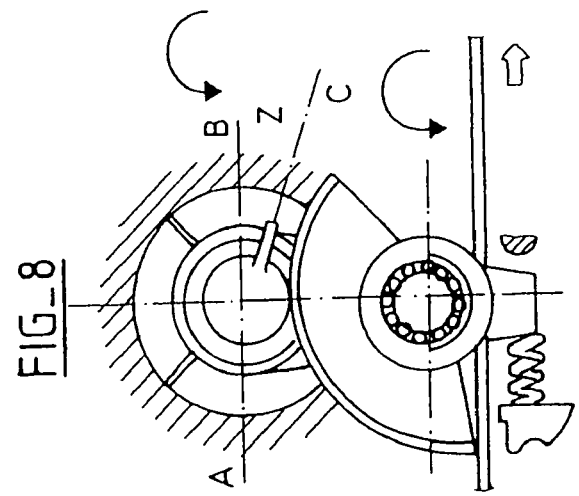
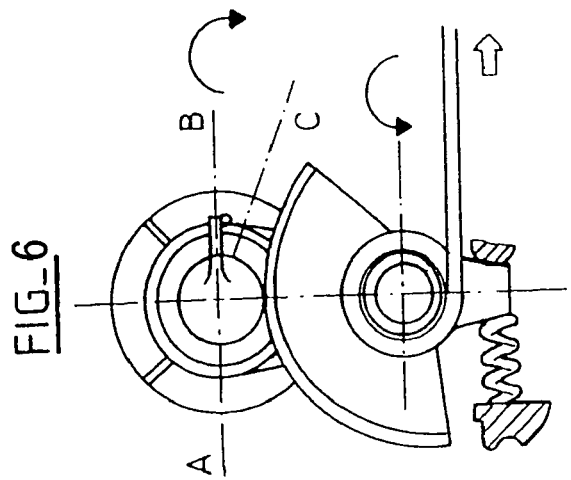

ACTUATOR FOR SYSTEMS FOR GUIDING SPACE EQUIPMENT WITH A VARIABLE RATE OF ROTATION

The field of the present invention is that of guidance components for equipment used in space applications, such as for example the manufacture of satellites, and in particular that of rotary aiming devices for space appendages.

In space applications, it is necessary to be able to orient certain elements of a satellite or of a space vehicle, such as an antenna, a mast, etc., in a predetermined direction in order, for example, to direct them towards a fixed star, to retain an aim towards a point on the surface of the earth, or else to sweep a particular zone on the surface of the earth or of any celestial body. These positionings must be frequently corrected in order to compensate for inevitable drift in the holding of this direction and these multiple corrections bring with them the generation of a large number of micro-rotation cycles for these space appendages and for their guidance devices.

Because of the irreversibility of placing a satellite in orbit, it is necessary to provide, during the design of the spacecraft, a service life, measured in number of cycles, that is very long for these items of equipment, in order to ensure their ability to withstand these extremely numerous actuations.

This phase, called fine aiming usually follows a deployment phase, during which the space appendages are taken out of the packaging that has been defined for the launch and are placed in position to ensure their operation. Even if, in certain cases, multiple deployments may need to be used, the latter remain very limited in number (at most a few tens, even about a hundred) and do not require the aiming devices to be dimensioned for the deployment in such a demanding manner as for fine aiming movements.

Since this equipment must operate in the space vacuum, a particular problem is encountered associated with the difficulty of ensuring a good lubrication of the portions in contact during these rotations.

The prior embodiments have been obliged to choose, for these rotary movements, between systems based on rolling bearings, bearings, ball-and-socket joints, or rail guides, etc. capable of providing large amplitude angular movements, and systems based on flexible components, with no contact between the rotating parts, but allowing only limited angular movements.

A positioning device has however been produced that is capable, with one and the same motorization, of producing large amplitude angular movements with a relatively short service life for a phase called the deployment phase and movements of small amplitude with a very long service life for a phase called the fine aiming phase.

Such a device is achieved, as shown in FIG. 1, by an assembly consisting of a part attached to the fixed portion of an item of space equipment, connected to one of the races of a ball or roller bearing via a connection that is elastic in rotation about the axis of the bearing and by a sleeve designed to actuate the movable portion of the equipment, rigidly connected to the other race of the bearing. A stop is attached to one of the races of the bearing in order to press against an element rigidly attached to the other race, in order to angularly limit the relative rotation of the two races. The positioning of this stop is adjustable in rotation on the supporting race which makes it possible to move at will the zone in which the fine aiming will be carried out. The deployment is carried out by rotating the bearing and the fine aiming is carried out by deforming the elastic connection, without consuming service cycles of the bearing.

It is now advisable to rotate this device in order to perform the deployment and fine aiming functions. The drive device in question must be able to deploy an object rapidly over a large amplitude (typically 180°) and then to aim it with precision (typically a few thousandths of a degree over a range of approximately 6°). For this, they must convert a continuous linear movement, of small amplitude, usually generated by a linear actuator, into a rotary movement with no range of movement, with a large service life capability.

The drive devices usually used in the field of satellites consist either of gear motors based on a stepper motor associated with a reduction gear of the "harmonic drive" type, or of mechanisms consisting of a stepper motor and a band reduction gear.

These devices are not satisfactory for the following reasons: either they have an internal range of movement that is incompatible with the precisions or service lives demanded (e.g.: gearing), or they propose a rate of rotation that is satisfactory for aiming, but at the price of an extremely detrimental deployment life, or finally they do not provide sufficient accuracy and then require an additional system to reduce the rate of rotation in aiming (such as for example a pulley with a changeable radius associated with a belt) but that is bulky and requires considerable linear travels.

The object of the present invention is to remedy these disadvantages by proposing an actuator that is capable of rotating a positioning device of the type represented in FIG. 1, and of ensuring an extremely accurate positioning in aiming. This actuator is capable of generating, from a reduced input linear travel, angular movements of great amplitude for the deployment phase and movements of small amplitude for the fine aiming phase.

Accordingly, the subject of the invention is an actuator for a device for the rotary positioning of a movable element for space equipment comprising a part attached to the fixed portion of said equipment, a bearing of the ball or roller type, a sleeve designed to actuate the movable portion of said equipment and mounted on an output shaft supported by a first race of said bearing, said actuator comprising a mechanically movable input means and being capable of converting a movement of the input means into a rotary movement of the output shaft about the axis of said bearing, characterized in that said second race of said bearing is connected in rotation to the part of said equipment, in that an adjustable stop is attached to said race and interacts with the sleeve so as to angularly limit the relative rotation of the two races of the bearing, and in that the rate of rotation of the output shaft in response to a movement of the input means is different depending on whether or not the sleeve is resting on the adjustable stop.

This makes it possible to pass from a large amplitude rotation when the sleeve is not on the adjustable stop to a movement of small amplitude for one and the same linear movement when the sleeve is on the adjustable stop. This provides the reduction effect that generates easy control in the fine aiming phase.

Preferably, the input means is a belt running around a guide pulley supported by a plate mounted as a radial extension on the second race.

Advantageously, the free end of the plate is returned by an elastic means against a stop that is fixed relative to the structure of the space equipment.

This makes it possible to deactivate the rotation rate reduction system used during the fine aiming, before contact of the sleeve on the adjustable stop.

Preferably, the free end of the plate is in contact with the fixed stop when the sleeve is not resting on the adjustable stop and is not in contact with the fixed stop when the sleeve is resting on the adjustable stop.

This makes it possible to decouple the two movements (deployment and fine aiming) by associating, in a one-to-one manner, a movement with a method of controlling this movement.

In a particular embodiment, the belt drives the sleeve by direct action on the output shaft.

Preferably, the belt drives the sleeve by means of a system gearing down the rotation of the guide pulley.

This configuration makes it possible to obtain a great range of movement during deployment with a very short travel of the input means of the actuator.

Preferably, the guide pulley is a double pulley, the belt running on a first pulley and the sleeve being driven by means of a second belt acting on the output shaft and running on a second pulley.

Advantageously, the second race of said bearing is connected in rotation to the part attached to the fixed part of said equipment by means of flexible arms.

The invention will be better understood and other objects, details, features and advantages of the latter will appear more clearly during the following detailed explanatory description of several embodiments of the invention given as purely illustrative and non-limiting examples, with reference to the appended schematic drawings.

In these drawings:

FIG. 1 is a front view of a rotary positioning device capable of being rotated by the actuator according to the invention;

FIG. 2 is a front view of a rotary positioning device moved by an actuator according to a first embodiment of the invention;

FIG. 3 is a view similar to FIG. 2, the space appendage being at the beginning of the deployment phase;

FIG. 4 is a view similar to FIG. 2, the space appendage being at the end of the deployment phase;

FIG. 5 is a view similar to FIG. 2, the space appendage being in the fine aiming phase;

FIG. 6 is one and the same front view of a rotary positioning device moved by an actuator according to a second embodiment of the invention, the space appendage being at the beginning of the deployment phase;

FIG. 7 is a view similar to FIG. 6, the space appendage being at the end of the deployment phase;

FIG. 8 is a view similar to FIG. 6, the space appendage being in the fine aiming phase.

With reference to FIG. 1, it shows a rotary positioning device capable of being moved by an actuator according to the invention comprising a circular ring 1 connected to the equipment of the satellite concerned. This ring 1 is connected via flexible arms 4 to a second circular ring 3 coaxial with the first, forming the outer race of a bearing of the ball or roller type. The inner race of said bearing supports an output shaft 2 to which is attached, via a connecting sleeve 6, a part (not shown) for rotating the movable portion of the equipment of the satellite concerned.

To the outer race of the bearing is attached an adjustable stop 5 on which the sleeve 6 stops, so as to prevent the output shaft 2 from rotating beyond this stop position.

FIG. 2 shows the actuator of the rotary positioning device comprising a belt drive track 7 supported by the output shaft 2, a plate 9 supported by the outer race 3 of the bearing, extending radially from said outer race, and a pulley 8, called a guide pulley, supported by this plate and free to rotate, on which two belt drive tracks coexist. A belt 10, actuated by a linear motor not shown, runs, for a first portion, on a first track of the guide pulley 8, as far as the drive track 7 of the output shaft to which it is preferably attached. Its second portion then returns to the linear motor via the second drive track of the guide pulley 8. The free end 11 of the plate 9 is pushed by a spring 12, connected to the structure of the equipment of the satellite concerned, towards a stop 13 that is fixed relative to the structure of the equipment.

FIGS. 3 to 5 show the sleeve 6 in positions A, B and C corresponding respectively to the positions for the start of deployment, the end of deployment and the range of movement in the fine aiming zone. The zone Z indicates the range of movement that the sleeve 6 is allowed by the flexibility of the arms 4 when said sleeve 6 is in contact with the adjustable stop 5, that is to say when the device is in the fine aiming phase.

FIGS. 6 to 8 show a second embodiment of the invention. The elements of the actuator that are identical to the first embodiment are indicated by the same reference number and are not described again.

Similarly here are shown the sleeve 6 in positions A, B and C corresponding respectively to the positions for the start of deployment, the end of deployment and range of movement in the fine aiming zone, and a zone Z of possible range of movement of the sleeve during fine aiming. The pulley 8 is a double pulley consisting of two pulleys or pulley sections 8A and 8B of different diameters. The belt 10 passes over the pulley 8A and returns directly to the linear motor. A second belt 20 connects the second pulley 8B, to which it is attached, to the drive track 7 of the output shaft 2. As above, the free end 11 of the plate 9 is pushed by a spring 12 towards a fixed stop 13.

The operation of the invention will now be described during a phase for the deployment of the equipment concerned of the satellite followed by a fine aiming phase.

Initially, the equipment concerned of the satellite is in a waiting position represented by the sleeve 6 in position A (FIG. 3). This sleeve must be brought into the zone Z, lying between positions B and C, so that the equipment concerned of the satellite can perform its function of aiming in a determined direction or of sweeping an earth zone. The extent of the zone Z is defined by those skilled in the art, during the design of the rotary positioning device, so as to obtain a sufficient amplitude to cover the future fluctuations in the direction that it is intended to pursue.

In use, prior to any deployment, the zone Z is positioned, by the operator before the launch, or in orbit by any automatic or remote controlled system provided for this purpose, by placing the adjustable stop 5 facing the direction or the zone to be covered.

The linear motor is set in action to move the belt 10 in the direction of the arrows appearing in FIG. 2.

This belt 10 passes over the first track of the guide pulley 8 and rotates the output shaft 2 by means of the drive track 7. The movement of the belt rotates the sleeve 6 from position A to position B. At the end of deployment (FIG. 4), that is to say when the rotation of this movable portion has reached the point where the sleeve 6 comes into contact with the adjustable stop 5, the bearing stops and its two races subsequently remain fixed relative to one another.

The rotation of the movable element of the equipment concerned may however continue beyond this position thanks to the flexibility of the arms 4 situated between the bearing and the fixed portion of the equipment concerned.

In response to the actuation of a guidance device (not shown), according to the requirements of the equipment of the satellite concerned, the linear motor continues its action to position the movable element of the equipment concerned in the precise direction desired. Doing so, it pushes round the monoblock assembly now consisting of the output shaft 2, the sleeve 6, the outer race 3 of the bearing and the plate 9 which supports the guide pulley 8. Simultaneously, the free end 11 moves away from the fixed stop 13, compressing the return spring 12 (FIG. 5) and deforms the flexible arms 4 until the desired direction is reached.

Under the action of the guidance device and of the movements of the pulley controlled in both directions by the linear motor, the position of the sleeve is driven inside the zone Z so as to fulfill the fine aiming mission required by the equipment of the satellite concerned, without the bearing itself being made to rotate.

If there is a request to retract the equipment in question, the linear motor is actuated in the reverse direction of the arrows of FIG. 2. Under the action of the return spring 12, the free end 11 of the plate 9 presses on the fixed stop 13 which stops the rotation of the plate 9 and separates the sleeve 6 from the adjustable stop 5. The flexible arms 4 are no longer flexed and the rotation of the sleeve 6 continues until it reaches the retracted position A.

Such an actuator makes it possible, as required for solving the technical problem associated with the invention, to make several large amplitude movements of the deployment phases by actuating the ball or roller bearing and the many small amplitude movements demanded during the fine aiming phase by the deformation of the flexible arms. Because all the small movements are made without using the bearing, the latter is used very little and consumes only a limited number of the operating cycles of its service life. The latter is then compatible with that of a satellite, even if the lubrication conditions in space are not optimal. On the other hand, the small movements are made without using parts coming into contact with one another, which therefore do not require lubrication. The service life of the fine aiming device, measured in number of operating cycles, is then relatively long.

An essential feature of the actuator according to the invention is the function of the reduction gear that is variable in rotation depending on whether it operates in deployment mode or in fine aiming mode.

Specifically, when the actuator operates in deployment mode, the torque that causes the rotation of the sleeve 6 is supplied by the action of the belt 10 rotating around the axis of the output shaft 2. The lever arm is equal to the diameter r of this output shaft, as indicated in FIG. 4. On the other hand, when the actuator operates in fine aiming mode, the torque is supplied by the rotation of the output shaft 2—outer race 3—plate 9 monoblock assembly about the same output shaft 2. The lever arm operated by the belt is then equal to the distance R represented in FIG. 5.

For the same individual linear movement L of the belt, the angular movement of the output shaft 2 has, in the deployment mode, a value $\Omega$ such that $L=r\Omega$ and, in the fine aiming mode, a value $\omega$ such that $L=R\omega$. Because r is much less than R, the rotation $\omega$ is much less than $\Omega$. The sensitivity of control of rotation by the linear motor, characterized by the low value of the angle $\omega$ obtained for a given movement L, is then considerably increased. Such an actuator therefore allows a positioning accuracy compatible with the aiming requirements of satellite equipment.

The operation of the actuator according to the second embodiment is similar to the first embodiment. The movement of the belt rotates the pulleys 8A and 8B. The pulley 8B rotates the second belt 20 which controls, as before, the rotation of the output shaft 2 by means of the drive track 7.

The advantage provided by this particular embodiment is a gearing down of the rotation of the output shaft during the deployment phase, in the ratio of the radii of the two pulleys 8A and 8B. The deployment of the space appendage concerned, from the position A to the position B, may be achieved by a much shorter linear movement of the belt 10. The operation of the actuator in the fine aiming phase is, for its part, identical to the previous embodiment.

Although the invention has been described with reference to several particular embodiments, it is abundantly evident that it is in no way limited thereto and that it includes all the technical equivalents of the means described and their combinations if the latter are included in the context of the invention.

The invention claimed is:

1. Actuator for a device for the rotary positioning of a movable element for space equipment comprising a part attached to the fixed portion of said equipment, a bearing of the ball or roller type, a sleeve designed to actuate the movable portion of said equipment and mounted on an output shaft supported by a first race of said bearing, said actuator comprising a mechanically movable input means and being capable of converting a movement of the input means into a rotary movement of the output shaft about the axis of said bearing, wherein said second race of said bearing is connected in rotation to the part of said equipment, wherein an adjustable stop is attached to said race and interacts with the sleeve so as to angularly limit the relative rotation of the two races of the bearing, and wherein the rate of rotation of the output shaft in response to a movement of the input means is different depending on whether or not the sleeve is resting on the adjustable stop.

2. Actuator according to claim 1, in which the input means is a belt running around a guide pulley supported by a plate mounted as a radial extension on the second race.

3. Actuator according to claim 2, in which the free end of the plate is returned by an elastic means against a stop that is fixed relative to the structure of the space equipment.

4. Actuator according to claim 3, wherein the free end of the plate is in contact with the fixed stop when the sleeve is not resting on the adjustable stop and is not in contact with the fixed stop when the sleeve is resting on the adjustable stop.

5. Actuator according to Claim 2, wherein the belt drives the sleeve by direct action on the output shaft.

6. Actuator according to Claim 2, wherein the belt drives the sleeve by means of a system gearing down the rotation of the guide pulley.

7. Actuator according to claim 6, in which the guide pulley is a double pulley, the belt running on a first pulley wherein the sleeve is driven by means of a second belt acting on the output shaft and running on the second pulley.

8. Actuator according to Claim 1, wherein the second race of said bearing is connected in rotation to the part by means of flexible arms.

9. Guidance system for space equipment comprising an actuator for a device for the rotary positioning of a movable element according to Claim 1.

10. Space equipment comprising a guidance system according to claim 9.

* * * * *